United States Patent
Liu et al.

(10) Patent No.: US 10,713,073 B2
(45) Date of Patent: Jul. 14, 2020

(54) SYSTEMS AND METHODS FOR IDENTIFYING CLOUD CONFIGURATIONS

(71) Applicant: Microsoft Technology Licensing, LLC, Redmond, WA (US)

(72) Inventors: Hongqiang Liu, Woodinville, WA (US); Jianshu Chen, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 535 days.

(21) Appl. No.: 15/367,935

(22) Filed: Dec. 2, 2016

(65) Prior Publication Data
US 2018/0159727 A1    Jun. 7, 2018

(51) Int. Cl.
| | | |
|---|---|---|
| G06F 15/16 | (2006.01) | |
| G06F 9/455 | (2018.01) | |
| H04L 12/24 | (2006.01) | |
| G06F 9/50 | (2006.01) | |
| H04L 12/26 | (2006.01) | |

(52) U.S. Cl.
CPC ........ *G06F 9/45558* (2013.01); *G06F 9/5072* (2013.01); *H04L 41/0806* (2013.01); *H04L 41/145* (2013.01); *H04L 41/147* (2013.01); H04L 43/16 (2013.01)

(58) Field of Classification Search
CPC ............... G06F 9/45558; G06F 9/5077; H04L 41/0806; H04L 41/145; H04L 41/147; H04L 43/16
See application file for complete search history.

(56) References Cited

U.S. PATENT DOCUMENTS

| | | |
|---|---|---|
| 2010/0088150 A1 | 4/2010 | Mazhar et al. |
| 2011/0153727 A1 | 6/2011 | Li |
| 2012/0239739 A1 | 9/2012 | Manglik et al. |

(Continued)

OTHER PUBLICATIONS

Sun, et al., "Cloud Service Selection: State-of-the-Art and Future Research Directions", In Journal of Network and Computer Applications, vol. 45, Oct. 2014, 29 pages.

(Continued)

*Primary Examiner* — Normin Abedin
(74) *Attorney, Agent, or Firm* — Faegre Drinker Biddle & Reath LLP (57) ABSTRACT

Provided are methods and systems for facilitating selection of a cloud configuration for deploying an application program with high accuracy, low overhead, and automatic adaptivity to a broad spectrum of applications and cloud configurations. The methods and systems are designed for building a performance model of cloud configurations, where the performance model is capable of distinguishing an optimal cloud configuration or a near-optimal cloud configuration from other possible configurations, but without requiring the model to be accurate for every cloud configuration. By tolerating the inaccuracy of the model for some configurations (but keeping the accuracy of the final result) it is possible to achieve both low overhead and automatic adaptivity: only a small number of samples may be needed and there is no need to embed application-specific insights into the modeling.

17 Claims, 5 Drawing Sheets

(56) References Cited

U.S. PATENT DOCUMENTS

| | | | |
|---|---|---|---|
| 2013/0080509 A1 | 3/2013 | Wang | |
| 2014/0200947 A1 | 7/2014 | Gujar et al. | |
| 2014/0229607 A1* | 8/2014 | Jung | H04L 43/0876 709/224 |
| 2014/0280946 A1 | 9/2014 | Mukherjee et al. | |
| 2015/0019301 A1 | 1/2015 | Jung et al. | |
| 2015/0237129 A1 | 8/2015 | Baker et al. | |
| 2015/0341240 A1* | 11/2015 | Iyoob | H04L 43/08 709/201 |
| 2018/0095458 A1* | 4/2018 | Sharber | G05D 1/0027 |

OTHER PUBLICATIONS

Eric Brochu, et al., "A Tutorial on Bayesian Optimization of Expensive Cost Functions, with Application to Active User Modeling and Hierarchical Reinforcement Learning", arXiv:1012.2599v1 [cs.LG], Dec. 2010, 49 pages.

Jacob R. Gardner, et al., "Bayesian Optimization with Inequality Constraints", Proceedings of the 31st International Conference on Machine Learning, vol. 32, 2014, 9 pages.

Herodotos Herodotou, et aL, "Starfish: A Self-tuning System for Big Data Analytics", 5th Biennial Conference on Innovative Data Systems Research (CIDR '11), 2011, pp. 261-272.

Yurong Jiang, et al., "WebPerf: Evaluating "What-If" Scenarios for Cloud-hosted Web Applications", SIGCOMM, 2016, 14 pages.

Shivaram Venkataraman, et al., "Ernest: Efficient Performance Prediction for Large-Scale Advanced Analytics", NSDI 16th USENIX Symposium on Networked Systems Design and Implementation, 2016, pp. 1-16.

Zhuoyao Zhang, et al., "Automated Profiling and Resource Management of Pig Programs for Meeting Service Level Objectives", Proc. of the 9th IEEE International Conference on Autonomic Computing (ICAC'2012), Sep. 2012, pp. 1-12.

* cited by examiner

SYSTEMS AND METHODS FOR IDENTIFYING CLOUD CONFIGURATIONS

BACKGROUND

With the growing popularity of big data analytics in the cloud, a larger emphasis is placed on identifying cloud configurations (e.g., choice of instance types, cluster sizes, etc.) that minimize the associated costs and running times. However, existing approaches for identifying suitable cloud configurations are rarely accurate, require high overhead, and often lack the ability to adapt to different analytical tasks and diverse cloud configurations.

SUMMARY

The following introduces a selection of concepts in a simplified form in order to provide a foundational understanding of some aspects of the present disclosure. The following is not an extensive overview of the disclosure, and is not intended to identify key or critical elements of the disclosure or to delineate the scope of the disclosure. The following merely presents some of the concepts of the disclosure as a prelude to the more detailed description provided thereafter.

The present disclosure relates generally to application program deployment and, more particularly, to using an adaptive performance model to facilitate the selection of a cloud configuration for an application program.

One embodiment of the present disclosure relates to a computer-implemented method for facilitating selection of a cloud configuration for deploying an application program, the method comprising: receiving, at a processor, input for the application program; generating, by the processor, candidate cloud configurations for the application program based on the received input; determining iteratively, by the processor, performance data for at least one of the candidate cloud configurations, the performance data based on running the at least one candidate cloud configuration in at least one cloud platform; and updating, by the processor, a performance model for the application program based on the performance data for the respective at least one candidate cloud configuration until a confidence measure for the updated performance model satisfies a threshold.

Another embodiment of the present disclosure relates to a system for facilitating selection of a cloud configuration for deploying an application program, the system including one or more processors, and a non-transitory computer-readable medium coupled to the one or more processors having instructions stored thereon that, when executed by the one or more processors, cause the one or more processors to perform operations comprising: receiving input for an application program, generating candidate cloud configurations for the application program based on the received input, determining, iteratively, performance data for at least one of the candidate cloud configurations, the performance data based on running the at least one candidate cloud configuration in at least one cloud platform, and updating a performance model for the application program based on the performance data for the respective at least one candidate cloud configuration until a confidence measure for the updated performance model satisfies a threshold.

Yet another embodiment of the present disclosure relates to a tangible, non-transitory computer readable medium, or media, storing machine readable instructions that, when executed by one or more processors, cause the one or more processors to perform operations comprising: receiving input for an application program, generating candidate cloud configurations for the application program based on the received input, determining, iteratively, performance data for at least one of the candidate cloud configurations, the performance data based on running the at least one candidate cloud configuration in at least one cloud platform, and updating a performance model for the application program based on the performance data for the respective at least one candidate cloud configuration until a confidence measure for the updated performance model satisfies a threshold.

Further scope of applicability of the methods and systems of the present disclosure will become apparent from the more detailed description given below. However, it should be understood that the following detailed description and specific examples, while indicating embodiments of the methods and systems, are given by way of illustration only, since various changes and modifications within the spirit and scope of the concepts disclosed herein will become apparent to those skilled in the art from the following detailed description.

BRIEF DESCRIPTION OF THE DRAWINGS

These and other objects, features, and characteristics of the present disclosure will become more apparent to those skilled in the art from a study of the detailed description that follows in conjunction with the appended claims and drawings, all of which form a part of this specification. In the drawings:

The headings provided herein are for convenience only and do not necessarily affect the scope or meaning of what is claimed in the present disclosure.

Embodiments of the present disclosure and their advantages are best understood by referring to the detailed description that follows. It should be appreciated that like reference numbers are used to identify like elements illustrated in one or more of the figures, wherein showings therein are for purposes of illustrating embodiments of the present disclosure and not for purposes of limiting the same.

DETAILED DESCRIPTION

Various examples and embodiments of the methods and systems of the present disclosure will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include other features not described in detail herein. Additionally, some well-known structures or functions may not be shown or described in detail below, so as to avoid unnecessarily obscuring the relevant description.

The present disclosure provides methods and systems for selecting cloud configurations that overcome the deficiencies of existing approaches discussed above. As will be described in greater detail herein, the methods and systems of the present disclosure are designed to adaptively and automatically build (e.g., generate) performance models for specific applications. As compared to existing approaches for selecting cloud configurations, the methods and systems of the present disclosure are capable of building an accurate model of an application while significantly reducing associated cost and running time.

Selecting the right cloud configuration for deploying an application program designed for big data analytics jobs can result in substantial cost savings without jeopardizing performance. Identifying and selecting an optimal cloud configuration for a given application becomes even more significant when considering the frequency of recurring analytics jobs, which will only continue to increase as it becomes easier for users to set up a query pipeline to process a stream of incoming data with high-level frameworks.

Running big data analytics in cloud computing networks is rapidly growing and has become an important tool in many areas of business including, for example, finance, public health, image recognition, natural language processing, genome analysis, and astronomy. Given the wide variety of use cases, a number of evolving techniques are used for data processing, such as Map-Reduce, SQL-like languages, Deep Learning, and in-memory analytics. These big data analytic applications in turn, have diverse behaviors and resource requirements (e.g., CPU, memory, disk, network, etc.).

Each big data analytics application needs to build a running environment in its cloud network. Architecturally, such applications have similar running environments, often a cluster of virtual machines (VMs) interconnected by a virtual network in the cloud. However, the cloud configurations of different applications, namely, the type of VM instances and the number of VMs, cannot simply be unified because different applications have their own considerations on performance and cost. Therefore, selecting the most optimal choice of cloud configurations for an application is essential to the application's service quality and commercial competitiveness. For example, a sub-optimal choice of cloud configuration for an application can result in a substantial (e.g., as much as a twelve times) difference in cost for the same performance target.

Given a representative workload of an application, it is desirable to determine a cloud configuration that either minimizes the cost given a running time budget, or minimizes the running time given a budgeted cost.

Selecting the most favorable (or "best" or "optimal") cloud configuration can be challenging because it is difficult to simultaneously achieve high accuracy, low overhead, and automatic adaptivity to different specific applications and workloads. To provide a better understanding of how the methods and systems of the present disclosure are capable of simultaneously achieving these criteria, each is described in greater detail below.

One example criterion in selecting a cloud configuration is accuracy. It is difficult to accurately predict the running time and cost for a given cloud configuration. The running time of an application has complex (e.g., non-linear) relationships to a variety of resources (e.g., CPU, RAM, network, disk, etc.) of the cloud instances and the input workload, internal workflows, and configurations of the applications. One cannot simply decipher or learn the relationships through, for example, linear regression or any other regression technique with a pre-defined format. Moreover, the dynamics inside cloud, such as resource multiplexing and stragglers further complicate the task of making a judgment on a cloud configuration, since the running time observed from an actual run over a cloud configuration contains substantial noises due to cloud dynamics.

Another example criterion in the selection of a cloud configuration is overhead. It can be expensive to search for the most favorable cloud configuration. Developers for each analytics application often face a wide range of cloud configuration choices. For example, some cloud computing platforms offer more than forty VM instance types with a variety of CPU, memory, disk, and network settings. Other cloud computing platforms offer nearly as many VM instance types while also allowing customized VMs with a specific amount of memory and CPU cores. Additionally, developers also need to choose the right cluster size for their applications and input workloads. Such large searching space makes it cost-prohibitive to use brute-force methodologies (e.g., exhaustive search) to find the most suitable or favorable cloud configuration.

A third example criterion in selecting a cloud configuration is adaptivity. Different applications have diverse internal architectures and dependencies in their data processing pipelines. Therefore, it is often necessary to design a customized performance prediction model for a specific application to ensure high accuracy and low overhead in selecting a suitable cloud configuration. However, manually learning the intricacies and internal structures of individual applications, and applying them in the modeling process is not scalable with the rapid development of applications, data types, data processing technologies, and cloud resources.

As will be described in greater detail herein, the methods and systems of the present disclosure alleviate the difficulties associated with achieving the above criteria by providing an automatic adaptivity of the selection process, in accordance with one or more embodiments. Determining and selecting an optimal cloud configuration is not a one-time event, but rather an ongoing process, in an embodiment. For example, as cloud resources change and/or as input workloads for a given application change, the most suitable or favorable cloud configuration for the application may change as well. Significant changes of input workloads may also affect the performance for some applications. Accordingly, the methods and systems of the present disclosure are designed to automatically adapt to determine optimal cloud configurations when changes occur, in at least an embodiment.

Existing approaches for selecting an optimal cloud configuration for an application are unable to adequately address the preceding challenges. For example, previous solutions typically focus on accurately predicting application performance. However, building an accurate prediction model either requires a large number of training data (large overhead) or only works for a small set of applications (poor adaptivity). For example, one existing approach trains a performance model for machine learning applications with a small number samples. However, since the performance model is tightly bound to the particular structure of machine learning jobs, it does not work well for more complex applications such as SQL queries. Further, it is difficult to apply application specific performance models across instance families as the resources available could be very different (e.g., predicting the performance on storage-optimized instances based on the performance on memory-optimized instances). Thus performance modeling approaches typically require retraining for every instance type.

Embodiments of the present disclosure relate to methods and systems for determining cloud configurations for big data analytics with high accuracy, low overhead, and automatic adaptivity to a broad spectrum of applications and cloud configurations. Applications of some embodiments include, for example, use by users of big data analytics directly and/or by third-party providers that offer add-on analytics services to users. It should be noted that one or more embodiments may be useful in various other applications in addition to or instead of the example applications described above.

In accordance with some embodiments, the methods and systems of the present disclosure are designed for building a performance model of cloud configurations, where the performance model is capable of distinguishing (e.g., determining, identifying, selecting, etc.) an optimal cloud configuration or a near-optimal cloud configuration from other possible configurations, but without requiring the model to be accurate for every cloud configuration. By tolerating the inaccuracy of the model for some configurations (but keeping the accuracy of the final result) it is possible to achieve both low overhead and automatic adaptivity: only a small number of samples may be needed and there is no need to embed application-specific insights into the modeling.

Figure 2:
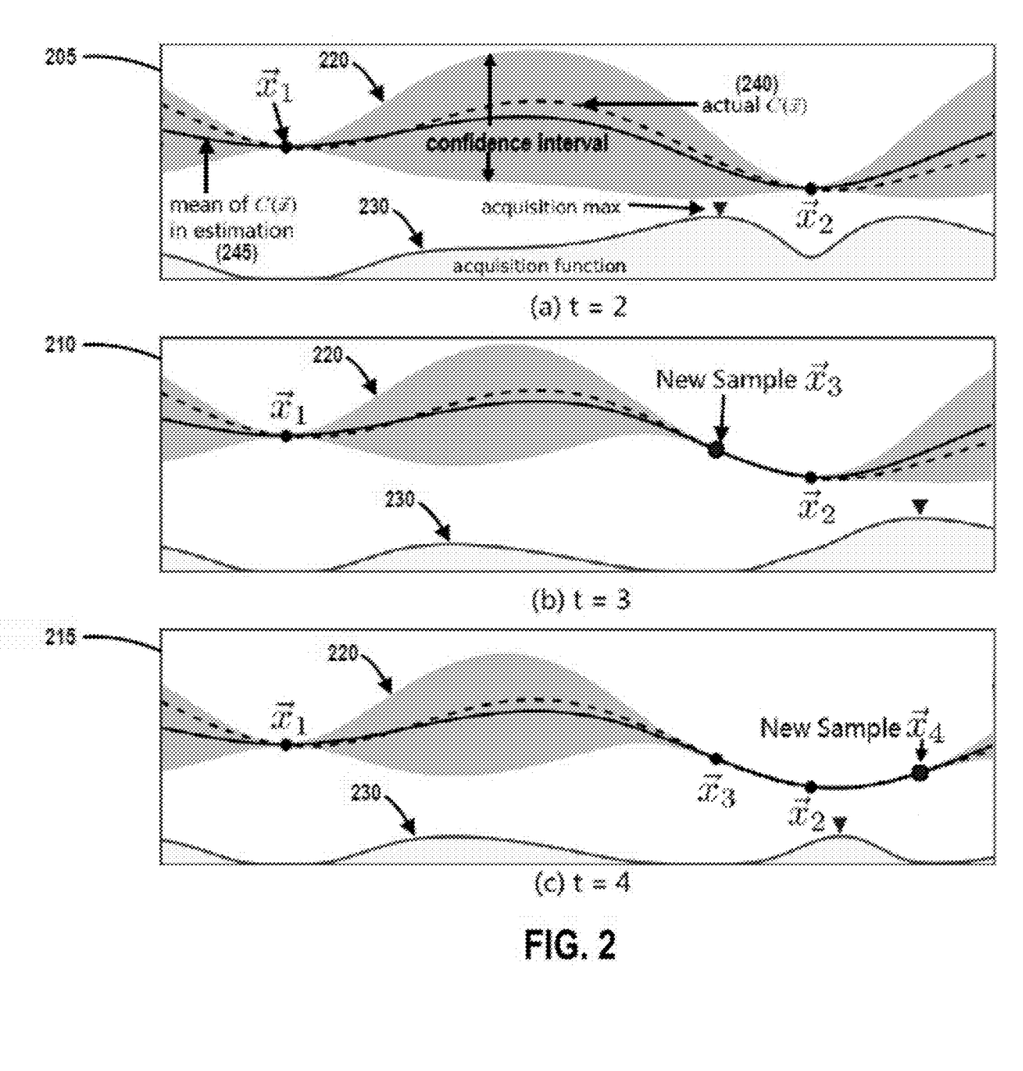
FIG. 2 is a set of graphical representations illustrating an example Bayesian Optimization process, according to one or more embodiments described herein.

In one or more embodiments, the methods and systems utilize Bayesian Optimization (BO). In one or more other embodiments, another suitable global optimization technique may be used. Unlike many traditional machine learning methods, BO is non-parametric, so that it does not have any pre-defined format for the performance model, in accordance with at least some embodiments. For example, in an embodiment, given one or multiple samples, BO may be used to estimate (e.g., generate) a confidence interval (e.g., a range that the actual value falls in with high confidence) of the cost and running time under each candidate cloud configuration. For example, FIG. 2 is a set of graphical representations that illustrates how a confidence interval, in accordance with one or more embodiments, evolves over time (e.g., t=2, t=3, t=4). In graphical representations 205, 210, and 215, the horizontal axis denotes different candidate cloud configurations, and the vertical axis denotes the cost/running time for each particular configuration. For each candidate cloud configuration, the confidence interval indicates what could be the largest and smallest value of cost/running time for that particular configuration, in an embodiment. Additional details regarding the example graphical illustrations 205, 210, and 215 of FIG. 2 will be provided in the sections that follow.

It should be noted that the estimated confidence interval is improved when more samples (e.g., candidate cloud configurations) are available. In accordance with one embodiment, the generated confidence interval of the performance model may be used to determine which candidate cloud configuration should be sampled next to approach an optimal configuration and minimize or eliminate the uncertainty in modeling. In accordance with one or more embodiments, the generated confidence intervals may be used to determine whether an optimal (e.g., most favorable or suitable) cloud configuration has been identified with a high confidence.

In example experiments, the methods and systems of the present disclosure were able to identify cloud configurations for popular analytical jobs with accuracy rates near 90% or higher while minimizing associated search costs and running times. For example, as compared to some existing solutions, the methods and systems of the present disclosure improved search time by over 100% and running time by up to 75%.

In accordance with an embodiment, a cloud configuration that is most suitable (e.g., favorable, optimal, etc.) for an application can be identified by accurately predicting the application's performance by, for example, building an accurate performance model for the application. In another embodiment, instead of relying on an accurate performance model for an application, an optimal cloud configuration for the application can be identified by actively searching through all possible configurations until a most favorable configuration is found.

An optimal cloud configuration for an application may be identified by accurately predicting the application's performance. For example, in accordance with an embodiment, an application's performance can be predicted by building an accurate model of the application's performance, and then that model may be used to select (e.g., choose, determine, etc.) the best configuration for the application. Therefore, one task addressed by the methods and systems of the present disclosure is building a model that works for a variety of applications on a variety of cloud configurations.

One existing approach for performance prediction relies on detailed models for specific application structure. Another existing approach collects detailed performance counters either at operating systems or at the framework level. Collecting performance counters for prediction often uses a large amount of data points across multiple features, and thus requires long training periods. Such training often takes too much time and cost, and thus outweighs the savings in the end. These existing approaches for performance prediction only work for a specific set of applications, and only tested a couple of instance types. As such, these existing approaches do not work well for the broader range of applications and instance types.

Rather than relying on an accurate performance model for an application, an optimal cloud configuration for the application may be identified by actively searching through all possible configurations until a most favorable configuration is found, in accordance with an embodiment. However, given a large number of instance types and an equally large number of cluster sizes for an application, exhaustively searching for an optimal configuration may entail several hundred runs. In addition, each candidate cloud configuration may need to be tried multiple times given the dynamics in performance caused by resource multiplexing, resource dynamics in the cloud, and stragglers.

To reduce the search time and cost, in at least one embodiment, a coordinate descent approach may be taken by searching one coordinate at a time. For example, in an embodiment, an optimal instance family may first be determined with fixed instance size and cluster size. An optimal instance size may be determined next, followed by an optimal cluster size. For example, in an embodiment, for each dimension, the other unknown dimensions may be set to, for example, the cheapest value possible. In some scenarios, however, this technique may arrive at a local optimal solution for an application.

In accordance with some embodiments, the methods and systems described herein are designed with the objective to determine an optimal cloud configuration with a limited or restricted amount of information, due to the desire to limit the number of runs of configurations. For example, in an embodiment, rather than accurately predicting application performance (or, conversely, eliminating any inaccuracy in predicting application performance), the method relies on a model that is accurate enough to determine a best configuration from the possible candidate configurations. In this manner, the method can be applied in a generic fashion to various applications, and also does not require a large amount of training data.

In contrast to existing static searching solutions, the methods and systems of the present disclosure dynamically adapt the searching scheme based on a current (e.g., updated) understanding and confidence interval of the performance model, in accordance with at least one embodiment. For example, in an embodiment, the method may dynamically select the next configuration that can best distinguish performance across possible candidate configurations, and therefore best eliminate unnecessary trials. The performance model can also be used to determine when it is appropriate to stop searching earlier, once a small enough confidence interval has been obtained. It should be noted that what constitutes a tolerable confidence interval for purposes of identifying an optimal cloud configuration may vary from one scenario to the next, from one user to the next, from application program to the next, etc. What may be considered an acceptable confidence interval for identifying an optimal cloud configuration may depend on a variety of factors including, for example, any constraints on budget, time, and/or other resources, particular significance or importance of a given application's performance, any user preferences, and the like. In an embodiment, an acceptable confidence interval for determining when a candidate cloud configuration is to be selected as an optimal cloud configuration for a given application program may be pre-determined in advance of proceeding with the method. In another embodiment, what is considered an acceptable or appropriate confidence interval may dynamically change or be adjustable as the method proceeds depending on, for example, changes to network conditions, changes to initial constraints, etc.

In an embodiment, the method for facilitating selection of a cloud configuration for an application program may proceed until a given configuration is determined to be within a confidence interval defined for the particular application program. For example, in an embodiment, rather than predicting an exact value of the cost/running time for a given candidate cloud configuration, the method may provide an estimate that the cost/running time for the particular configuration will be in a certain range with high probability (e.g., confidence interval). For example, suppose the cost for deploying an application using a given cloud configuration is $1,295. In accordance with an embodiment, the method for facilitating selection of an optimal cloud configuration will provide an estimate (confidence interval) that the true cost for deploying the application using the subject cloud configuration will be somewhere between $1,100 and $1,300 with probability 95%, instead of finding the exact value of $1,295 since finding the exact value will be costly by itself. As long as the $200 dollar uncertainty is tolerable or acceptable given the particular circumstances (e.g., with respect to the user, the application, etc.), then the process may end without further consideration of additional candidate cloud configurations.

Figure 1:
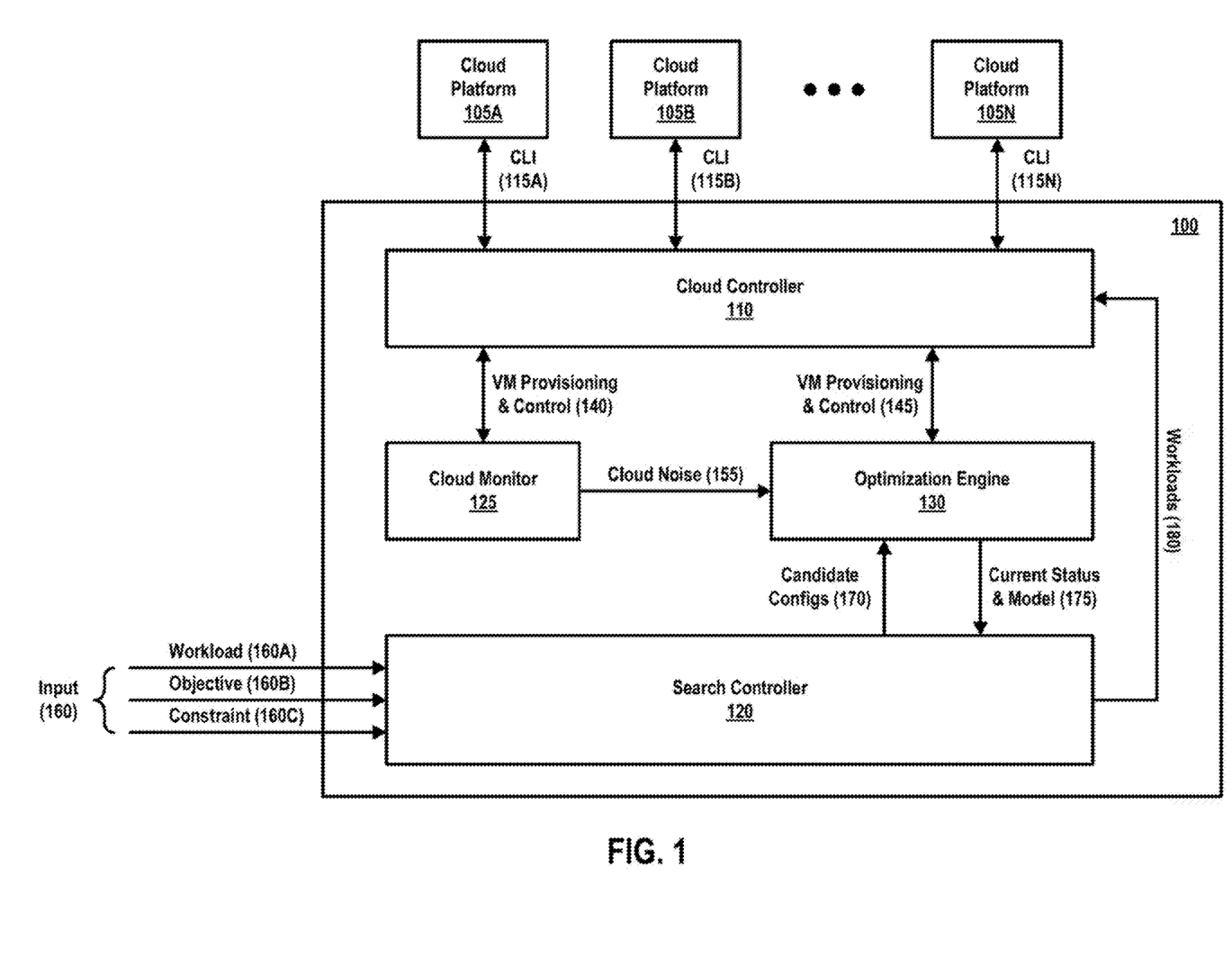
FIG. 1 is a block diagram illustrating an example system for cloud configuration selection, according to one or more embodiments described herein.

FIG. 1 shows example data flows in a system 100 for cloud configuration selection. In accordance with one or more embodiments described herein, the system 100 may include search controller 120, cloud monitor 125, optimization engine 130, and cloud controller 110. It should be understood that in one or more other embodiments, the example system 100 may include other components in addition to or instead of the example components mentioned above. Similarly, the system 100 for cloud configuration selection may include fewer components than the number of example components shown, or one or more of the example components shown may be combined, without departing from the operations, features, or functionalities of the system as described herein.

In an embodiment, the search controller 120 may be configured to coordinate the cloud configuration selection process. In an embodiment, the search controller 120 may receive input (160). The input (160) may be received at the search controller 120 from, for example, a user (e.g., developer), a database, an external system, or the like. In at least one embodiment, the input (160) may include one or more of a representative workload (160A) of an application, an objective (160B) (e.g., minimize cost, minimize run time, etc.), and one or more constraints (160C) (e.g., cost budget, maximum running time, preferred instance types, maximum/minimum cluster size, etc.). In some embodiments, the input (160) received at the search controller 120 may include various other data in addition to or instead of the example inputs described above.

The search controller 120 may use the input (160) to generate (e.g., produce, retrieve, or otherwise obtain) candidate cloud configurations (170), in an embodiment. In one or more other embodiments, the search controller 120 may generate the candidate cloud configurations (170) based on various other data and/or inputs in addition to or instead of the input (160). The search controller 120 may provide the candidate cloud configurations (170) to the optimization engine 130. In accordance with at least one embodiment, the search controller 120 may provide one or more workloads (180) to the cloud controller 110. For example, in an embodiment in which the input (160) includes one or more representative workloads (160A), the search controller 120 may provide the workloads (180) to the cloud controller 110 for installation in one or more cloud platforms 105 (e.g., one or more of cloud platforms 105A, 105B, 105N, where "N" is an arbitrary integer). Depending on the implementation, the search controller 120 may install a workload (180) to one of the cloud platforms 105 via the cloud controller 110, in an embodiment.

In accordance with an embodiment, the search controller 120 may install the representative workload (180) to a cloud platform 105 by creating a virtual machine (VM) in the cloud platform 105 and installing the representative workload (180) (e.g., application and input data) at the VM. Once the representative workload (180) is installed at the VM, the search controller 120 may capture a customized VM image that contains the workload, in an embodiment.

In at least one embodiment, search controller 120 may also be configured to monitor the current status and model (175) on the optimization engine 130. Further, in an embodiment, the search controller 120 may be configured to evaluate a stopping condition in connection with searching the candidate cloud configurations (170), and based on the stopping condition being met (e.g., satisfying one or more thresholds), determine that no additional searching should be performed. Further details about the candidate cloud configurations, searching process, and stopping condition will be provided in the sections that follow.

In one or more embodiments, the cloud monitor 125 may be configured to continuously run benchmarking workloads of big data analytics, which may be defined by the system 100 on different cloud platforms 105 (e.g., one or more of cloud platforms 105A, 105B, and 105N). In an embodiment, the cloud monitor 125 may obtain or generate a measurement of the variance of running time of the same workload (e.g., workload 160A) for a given candidate cloud configuration, and determine (e.g., calculate) an amount of cloud noise (155), which is data that may be provided to the optimization engine 130 evaluating the given candidate cloud configuration. For example, in an embodiment, the cloud noise (155) calculated by the cloud monitor 125 may be provided to the optimization engine 130 as a multiplicative noise factor ($\varepsilon$) introduced by the uncertainties in clouds. Additional details regarding the noise factor ($\varepsilon$) will be described below with respect to Equations 5-9. It should be noted that in at least some embodiments, the continuous monitoring performed by the cloud monitor 125 may be lightweight (e.g., the monitoring may be run at periodic time intervals (e.g., every 2 or 3 hours) with a limited number of instances).

In an embodiment, the optimization engine 130 may be a Bayesian optimization engine. In an example implementation, the optimization engine 130 may be built on top of an implementation of BO in a particular programming language (e.g., a high-level, general-purpose, dynamic programming language, such as Python™). In at least one embodiment, the optimization engine 130 may take a sample of a selected candidate cloud configuration (170), submit a cluster creation request to the cloud controller 110, and start a workload request via the cloud controller 110.

In at least one embodiment, the cloud controller 110 is an adaptation layer configured to handle the heterogeneity to control the clouds 105. The cloud controller 110 may exchange VM provisioning and control (140) with the cloud monitor 125 and also exchange VM provisioning and control (145) with the optimization engine 130. Each cloud 105 may have its own command line tools and semantics (CLI 115A, 115B, and 115N for cloud platforms 105A, 105B, and 105N, respectively) for performing operations such as, for example, creating and deleting VMs, creating and deleting virtual networks, capturing images from VMs, and listing available instance types. In an embodiment, the cloud controller 110 may define a uniform API for other modules, units, etc. in the system 100 to perform some or all of the operations described above. For example, the API may also include sending commands directly to VMs in the clouds 105 via, for example, SSH, which facilitates control of the running workloads in the clouds 105.

Figure 3:
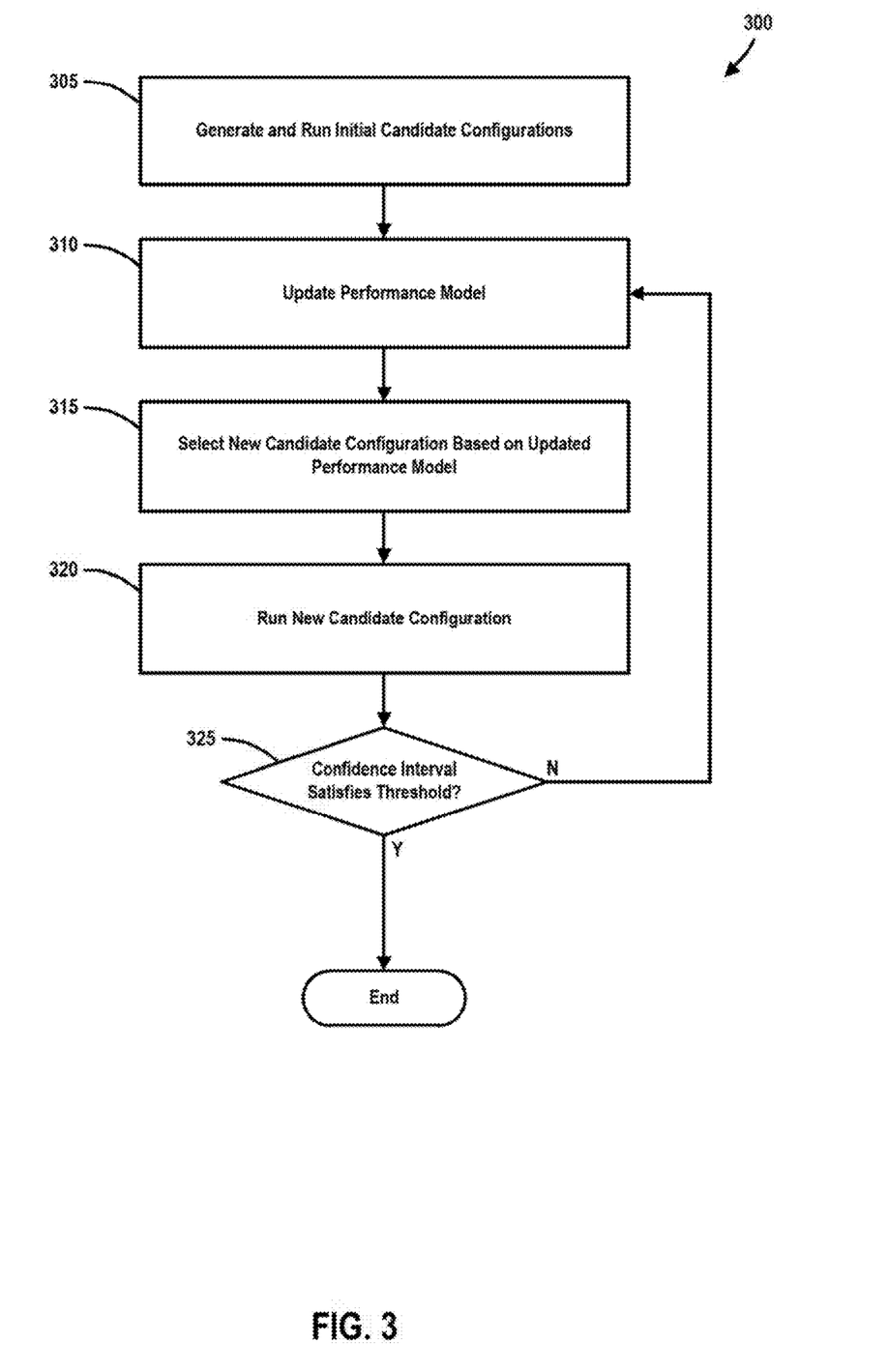
FIG. 3 is a flowchart illustrating an example process for generating a performance model and evaluating candidate cloud configurations, according to one or more embodiments described herein.

FIG. 3 shows an example process 300 for generating (e.g., building, creating, etc.) a performance model and evaluating candidate cloud configurations, in accordance with one or more embodiments of the present disclosure. At block 305, initial candidate cloud configurations may be generated (e.g., selected, chosen, etc.) and then run. For example, in an embodiment, a small number (e.g., three, five, etc.) of candidate cloud configurations may be selected as the initial group. At block 310, the performance model may be updated with the configuration details (e.g., VM instance types, CPU, memory, disk, and network settings, cluster size, etc.).

In an embodiment, updating the performance model at block 310 may include, for example, re-computing a confidence interval using an optimization technique. In some embodiments, the optimization technique may be Bayesian Optimization (BO). In one or more other embodiments, a different optimization technique may be used to recalculate the confidence interval at block 310.

At block 315, a new candidate cloud configuration may be selected based on the updated performance model. In this manner, the new candidate cloud configuration is dynamically selected at block 315. At block 320, the new candidate cloud configuration selected at block 315 may be run, and the results (e.g., configuration details, job completion time, etc.) may be used to make a determination at block 325 as to whether a confidence interval for the new candidate cloud configuration satisfies a threshold. If it is determined at block 325 that the confidence interval satisfies the threshold, the process 300 may end. On the other hand, if it is determined at block 325 that the confidence interval for the new candidate cloud configuration does not satisfy the threshold, then the results of running the configuration at block 320 may be fed back as input to the performance model at block 310. In an embodiment, the threshold used in the determination at block 325 may be a pre-determined threshold, while in another embodiment the threshold used at block 325 may be an adaptable or adjustable threshold. For example, in an embodiment, the threshold used for the confidence interval at block 325 may be adapted based on an accrued cost, an estimate of total cost, or the like.

In an embodiment, the threshold used at block 325 for determining whether the confidence interval for the given candidate cloud configuration is acceptable may be similar to the example "stopping condition," which is described in greater detail below. For example, in an embodiment, the stopping condition for purposes of determining when a given candidate cloud configuration is to be selected as an optimal cloud configuration for an application program may be based on a determination that one or more criteria have been met. For example, the stopping condition may be based on a determination that a modified expected improvement (e.g., as defined in Equation (4) below) is less than a threshold percentage (e.g., 8%, 10%, 13%, etc.) and at least a minimum number (e.g., 5, 6, 8, etc.) of candidate cloud configurations have been observed (e.g., evaluated, assessed, etc.).

Additional details regarding one or more of blocks 305-325 in the example process 300 for performance modeling and configuration searching will be provided in the sections that follow.

In one or more embodiments, the methods and systems described herein determines an optimal cloud configuration using BO. As will be described in greater detail below, the methods and systems for selecting a cloud configuration are adaptive to a wide variety of applications and cloud configurations, notwithstanding any noises caused by cloud internal dynamics (e.g., resource multiplexing, stragglers, etc.).

In at least one embodiment, the process for determining an optimal cloud configuration may be structured as follows: for a given application and workload, determine the optimal or near-optimal cloud configuration that satisfies one or more performance criteria (e.g., thresholds, parameters, etc.) and minimizes cost (e.g., resource costs).

In an embodiment, $T(\vec{x})$ denotes the running time function for an application and its input workloads. In an embodiment, the running time may depend on the cloud configuration vector $\vec{x}$, which includes, for example, instance family types, CPU, RAM, and various other resource configurations. In an embodiment, $P(\vec{x})$ denotes the price per unit time for cloud configuration $\vec{x}$, and thus the following problem statement may be formulated:

$$\underset{\vec{x}}{\text{minimize}}\, C(\vec{x}) = P(\vec{x}) \times T(\vec{x}) \qquad (1)$$

$$\text{subject to } T(\vec{x}) \leq \mathcal{T}_{max}$$

where $C(\vec{x})$ is the total cost of cloud configuration $\vec{x}$, and $\mathcal{T}_{max\,max}$ is the maximum tolerated running time. It should be understood that while knowing $T(\vec{x})$ under all candidate cloud configurations makes it straightforward to solve Equation (1), it is often cost-prohibitive to do so since all candidate cloud configurations would need to be tried. Accordingly, in at least one embodiment, the method of the present disclosure utilizes BO (with Gaussian Process Priors) to directly search for the solution of Equation (1) with significantly lower cost. Additional details about directly determining the solution of Equation (1) will be provided below.

In accordance with an embodiment, Bayesian Optimization (BO) provides a framework for solving an optimization problem such as that presented in Equation (1), in which the objective function $C(\vec{x})$ is unknown beforehand, but observable. In an embodiment, by modeling $C(\vec{x})$ as a stochastic process (e.g., a Gaussian Process (GP)), BO may be used to compute the confidence interval of $C(\vec{x})$ according to one or multiple samples taken from $C(\vec{x})$. In at least one embodiment, a "confidence interval" is an area that the curve of $C(\vec{x})$ is most likely (e.g., with at least a 95% probability) going to pass through.

For example, FIG. 2 is a set of graphical representations showing an example of a BO process. In graphical representations 205, 210, and 215, the dashed line 240 denotes the actual function $C(\vec{x})$. After two samples are taken at $\vec{x}_1$ and $\vec{x}_2$, BO may be used to compute a confidence interval 220, which is denoted by the upper shaded portion in each of graphical representations 205, 210, and 215. The solid line 245 in each of the graphical representations 205, 210, and 215 denotes the expected value of $C(\vec{x})$ (e.g., mean of $C(\vec{x})$ in estimation), and the value of $C(\vec{x})$ at each input point falls in the confidence interval 220 with 95% probability.

In at least an embodiment, the confidence interval 220 may get updated (e.g., posterior distribution in Bayesian Theorem) after new samples are taken at $\vec{x}_3$ (graphical representation 210) and $\vec{x}_4$ (graphical representation 215), and the certainty of $C(\vec{x})$ increases as the confidence interval 220 area becomes smaller.

In some embodiments, BO can be used to determine the next point to sample. For example, in an embodiment, BO can be used to determine the next sample point by using a pre-defined acquisition function 230, which may also get updated with the confidence interval 220, according to an embodiment. As shown in the example graphical representations 205, 210, and 215, new sample point $\vec{x}_3$ may be selected because the acquisition function 230 at t=2 indicates that it has the most potential gain. Similarly, new sample point $\vec{x}_4$ may be selected because the acquisition function 230 at t=3 indicates that it has the most potential gain.

With reference to the example process 300 for performance modeling and configuration searching (shown in FIG. 3 and described in detail above), in an embodiment, block 310 of the process may include utilizing BO to update the confidence interval of the objective function $C(\vec{x})$. In an embodiment, block 315 may include selecting a new candidate configuration to run (e.g., at block 320) based on the acquisition function of BO (e.g., acquisition function 230). For example, the new candidate configuration that is selected at block 315 may be the configuration that has the most potential gain according to the acquisition function. In accordance with one or more embodiments, at block 325 of the example process 300, it may be determined whether to stop searching candidate cloud configurations based on the confidence interval of the objective function $C(\vec{x})$ provided by BO (e.g., whether the confidence interval of $C(\vec{x})$ satisfies a threshold).

It should be noted that one useful property of BO is that the technique can accommodate observation noises in calculating the confidence interval of the objective function. For example, given an input point $\vec{x}$, suppose that there is no direct access to $C(\vec{x})$, and instead it is only possible to observe $C(\vec{x})'$, which is:

$$C(\vec{x})' = C(\vec{x}) + \varepsilon \qquad (2)$$

where $\varepsilon \sim \mathcal{N}(0, \sigma_\varepsilon^2)$. Because $C(\vec{x})'$ remains to be Gaussian, BO may be used to infer the confidence interval of $C(\vec{x})$ according to the samples of $C(\vec{x})'$ and $\varepsilon$. Additional details on how BO may be used to compute the confidence interval of $C(\vec{x})$ are known to those of ordinary skill in the art. It should be noted that in the present example, the observation noise on $C(\vec{x})$ may be considered negligible given the accuracy of the measurement on running time and price model.

In accordance with some embodiments described herein, by integrating BO, the methods and systems of the present disclosure are capable of efficiently understanding the objective function, and thus take samples (e.g., consider candidate cloud configurations) only in the areas of the objective function that are most likely to contain the minimum point. For example, with reference to graphical representation 215 in FIG. 2, it can be seen that both $\vec{x}_3$ and $\vec{x}_4$ are close to the minimum point of the actual objective function $C(\vec{x})$ (e.g., dashed line 240), leaving the interval between $\vec{x}_1$ and $\vec{x}_4$ unexplored without any impact on the final result.

As described above, BO is an effective technique for determining optimal cloud configurations for big data analytics applications for a variety of reasons. For example, BO is non-parametric, and therefore does not limit the objective function model with any pre-defined format, and is also capable of matching any function eventually. In the context of the methods and systems described herein, this property of BO allows the methods and systems to be widely applicable across a variety of applications and cloud configurations. It is known that running time is non-linear and varies with different cloud configurations (e.g., CPU, memory, disk, and network resources, etc.) and different applications of queries (and their configurations and input workloads). Additionally, since the objective function $C(\vec{x})$ is considered to be smooth in that the function does not dramatically change between two close input points, it is straightforward to capture the function using a Gaussian Process as the prior function in BO.

Another example of why BO is used in accordance with one or more embodiments of the present disclosure is that BO works well with a small number of samples (e.g., preferably less than 10 samples out of hundreds of candidate cloud configurations). As described above, the methods and systems presented herein are designed to limit the number of samples needed in order to, for example, minimize associated cost and time. Such limited sample size makes it difficult to apply other complex techniques (e.g., deep neural networks, etc.) that require a large amount of training data to build a performance model of cloud configurations.

Yet another example of why BO is effective in determining optimal cloud configurations for big data analytics applications is that BO is able to tolerate uncertainty. In accordance with some embodiments, the methods and systems described herein are designed to handle two primary sources of uncertainty. First, because a dynamic approach is taken which aims to quickly determine an optimal cloud configuration, it may only be possible, in at least some scenarios, to collect a few samples of running time for a few candidate cloud configurations. As such, a performance model with some degree of inaccuracy is to be expected. Second, the cloud may not report a stable running time even for the same application due to, among other things, resource multiplexing across applications, stragglers, etc. In one or more embodiments, BO may be used to quantitatively define the uncertainty region of the performance model. The confidence interval that may be computed with BO can be used to guide the process (e.g., can be used as the basis for decision-making) of searching candidate cloud configurations notwithstanding the performance model inaccuracies.

In accordance with one or more embodiments, various design parameters (e.g., design options, design decisions, etc.) may be selected to make BO an effective technique for determining optimal cloud configurations. For example, in at least one embodiment, the design parameters that may be selected to effectively leverage BO include (i) prior function, (ii) acquisition function, (iii) stopping condition, and (iv) encoding cloud configurations. Further details about each of these example design parameters are provided below, together with the options that may be chosen for each to most effectively utilize BO. However, it should be understood that in some embodiments, one or more the following example design parameters may not be selected in the manner described. Further, in some embodiments, one or more other design parameters may be used in addition to or instead of the following example design parameters.

(i) Prior Function. In accordance with an embodiment, Gaussian Process may be used as the prior function. Such a selection is based on the assumptions that the distributions of the function values are all Gaussian. Gaussian Process is known to have flexibility and tractability, and is a commonly used prior function for smooth functions in BO. Therefore, in accordance with an embodiment, $C(\vec{x})$ may be described with a mean function $\mu(\cdot)$ and covariance kernel function $k(\cdot,\cdot)$. Thus, for any pairs of input points $\vec{x}_1, \vec{x}_2 \in \mathbb{R}^d$, there is:

$$\mu(\vec{x}_1) = \mathbb{E}[C(\vec{x}_1)]; \mu(\vec{x}_2) = \mathbb{E}[C(\vec{x}_2)]$$

$$k(\vec{x}_1, \vec{x}_2) = \mathbb{E}[(C(\vec{x}_1) - \mu(\vec{x}_1))(C(\vec{x}_2) - \mu(\vec{x}_2))]$$

Intuitively, if two cloud configurations, $\vec{x}_1$ and $\vec{x}_2$ are similar to each other, $C(\vec{x}_1)$ and $C(\vec{x}_2)$ should have large covariance. Conversely, if the two cloud configurations are not similar to each other, $C(\vec{x}_1)$ and $C(\vec{x}_2)$ should have small covariance. It should be understood by those of skill in the art that, to express this intuition, it is possible to use any of a variety of formats of the covariance functions between inputs $\vec{x}_1$ and $\vec{x}_2$, which decrease when $\|\vec{x}_1 - \vec{x}_2\|$ grow.

Acquisition Function. There are numerous strategies for designing an acquisition function (e.g., acquisition function 230 in the example graphical representations shown in FIG. 2). For example, an acquisition function may be based on probability of improvement (PI), or picking the point that can maximize the probability of improving the current optimal (or best) candidate. Another example includes designing an acquisition function based on expected improvement (EI), or picking the point that can maximize the expected improvement over the current optimal or best candidate. Yet another example includes designing an acquisition function based on Gaussian Process Upper Confidence Bound (GP-UCB), or picking the point with a certainty region that has the smallest lower bound (e.g., when a function is minimized). In at least one embodiment, the methods and systems of the present disclosure utilize an acquisition function that is based on, or designed according to, the EI method (which may sometimes be referred to as an "EI acquisition function"). It has been shown that the EI method is better-behaved than PI, but unlike the method of GP-UBC, EI does not require its own tuning parameter. In accordance with one or more other embodiments, the acquisition function may be based on, or designed according to, either of the PI or GP-UBC methods instead of the EI method.

In at least one embodiment, the EI acquisition function may take the example form derived as follows. Let $X_t$ be the collection of all cloud configurations whose function values have been observed by round t, and $m = \min_{\vec{x}}\{C(\vec{x}) \vec{x} \in X_t\}$ as the minimum function value observed so far. For each input $\vec{x}$ that is not yet observed, evaluate its expected improvement if the input is selected as the next point to observe using the following equation:

$$EI(\vec{x}) = \begin{cases} (m - \mu(\vec{x}))\Phi(Z) + \sigma(\vec{x})\phi(Z), & \text{if } \sigma(\vec{x}) > 0 \\ 0, & \text{if } \sigma(\vec{x}) = 0 \end{cases} \quad (3)$$

where $$\sigma(\vec{x}) = \sqrt{k(\vec{x}, \vec{x})}, \, Z = \frac{m - \mu(\vec{x})}{\sigma(\vec{x})},$$

$\Phi$ is the standard normal cumulative distribution function, and $\phi$ is the standard normal probability density function.

The example acquisition function expressed in Equation (3) is designed to minimize $C(\vec{x})$ without further constraints. However, as shown in Equation (1), above, there is still a performance constraint $T(\vec{x}) \leq \mathcal{T}_{max}$ to consider. As such, selecting the next candidate cloud configuration to evaluate (e.g., at block 315 in the example process 300 shown in FIG. 3) may be based on the candidate cloud configuration that is likely to satisfy the performance constraint, in an embodiment. For example, a model may be built of running time function $T(\vec{x})$ from $$\frac{C(\vec{x})}{P(\vec{x})}.$$

The EI acquisition function may then be modified as:

$$EI(\vec{x})=P[T(\vec{x})\leq \mathcal{T}_{max}]\times EI(\vec{x}) \qquad (4)$$

Stopping Condition. With BO, any of a variety of known techniques may be used to determine when to stop a search for an optimal cloud configuration. To limit the cost of searching, a stopping condition may be defined (e.g., a stopping condition may be utilized at block 325 of the example process 300 shown in FIG. 3). For example, in an embodiment, the stopping condition may be based on when the expected improvement in Equation (4) is determined to be less than a threshold amount (e.g., 5%, 10%, 12%, etc.). In another embodiment, the stopping condition may be further be based on when there are at least N (e.g., where N=4, N=6, N=9, etc.) cloud configurations that have been observed (e.g., evaluated, assessed, considered, etc.). In another embodiment, the stopping condition may be based on a combination of the two example conditions described above. In still another embodiment, the stopping condition may be based on whether the confidence interval of the objective function satisfies a threshold.

In accordance with at least one embodiment, the modified EI in Equation (4) helps to ensure that the original expected improvement (computed in Equation (3)) will be as large as possible while the running time is less than a certain constraint. For example, if a hypothetical goal is to minimize the cost (e.g., money spent) on running a certain application on cloud given the constraint that it can be done in 20 hours, the methods and systems described herein may be utilized to facilitate searching candidate cloud configurations and identifying an optimal configuration when, for example, the expected improvement cannot be further improved beyond a given threshold (e.g., 10%), under the constraint of the running time being less than 20 hours. As such, the intuition behind expected improvement is the expected amount of savings that can be achieved by performing another iteration of searching candidate cloud configurations. For example, suppose that in a first iteration it is determined that a new candidate cloud configuration could result in a cost savings of, for example, 50% compared to the current candidate cloud configuration. Then in a second iteration it is determined that a new candidate cloud configuration could result in an additional cost savings of 15%, and so on, until in some subsequent iteration (e.g., sixth, seventh, etc.) it is determined that a new candidate cloud configuration could result in an additional cost savings of only 9%. At that point, the process may end and the current candidate cloud configuration may be selected as the optimal cloud configuration for the subject application program, in an embodiment.

In an embodiment, when the stopping condition has been met (e.g., satisfied, triggered, etc.), the candidate cloud configuration that is currently considered the best or most optimal is selected as the final candidate cloud configuration. It should be understood that the stopping condition is a balance between the optimality of the final result (e.g., the selected optimal candidate cloud configuration) and the cost of searching candidate cloud configurations. While the stopping condition ensures that the search is not hastily stopped during the initial stages, it also prevents the process from pursuing small improvement with endless observations efforts.

Encoding Cloud Configurations. In an embodiment, one or more of the following example features may be encoded into an input $\vec{x}$ to better represent a cloud configuration: the number of VMs, the number of cores, CPU speed per core, RAM size, disk size, disk speed, and network bandwidth per VM. To reduce searching space of BO, some or all of the encoded features may be normalized and discretized. For example, in an embodiment, disk speed may be defined as fast (0) and slow (1) to distinguish SSD and magnetic disks. Similar definitions may be used for CPU speed to distinguish high-performance CPUs from more common CPUs. In accordance with an embodiment, network speed or bandwidth may be classified into multiple (e.g., 6, 8, etc.) levels, instead of using the actual numbers. It should be noted that numerous other features may be encoded into an input in addition to or instead of the example features described above. Also, one or more of the encoded features may be normalized and/or discretized in various other ways in addition to or instead of the examples described above.

In some of the embodiments described herein, it is assumed that the relation between cloud configuration and cost (or running time) is deterministic. However, there are a numerous uncertainties associated with cloud networks. For example, the resources of clouds are shared by multiple users such that the workloads of different users could cause interference with one another. Also, failures and resource overloading are common occurrences in clouds, and can have an impact on the running time to complete a job. Accordingly, some embodiments of the present disclosure are designed to address the uncertainties associated with clouds.

In accordance with an embodiment, the running time that can be observed from an actual run on configuration $\vec{x}$ is denoted $\tilde{T}(\vec{x})$ and the cost is denoted $\tilde{C}(\vec{x})$. Letting $T(\vec{x})= \mathbb{E}[\tilde{T}(\vec{x})]$ and $C(\vec{x})=\mathbb{E}[\tilde{C}(\vec{x})]$ gives:

$$\tilde{T}(\vec{x})=T(\vec{x})(1+\varepsilon) \qquad (5)$$

$$\tilde{C}(\vec{x})=C(\vec{x})(1+\varepsilon) \qquad (6)$$

where $\varepsilon$ is a multiplicative noise introduced by the uncertainties in clouds. Because there are many random causes that can result in the variance of the total running time, $\varepsilon$ may be modeled (e.g., according to Central Limit Theorem) as normally distributed: $\varepsilon\sim N(0,\sigma_\varepsilon^2)$. Therefore, in an embodiment, Equation (1) becomes minimizing the expected cost with the expected performance satisfying the constraint.

BO cannot infer the confidence interval of $C(\vec{x})$ from the observation of $\tilde{C}(\vec{x})$ because the latter is not normally distributed, given that BO assumes $C(\vec{x})$ is Gaussian and so is $(1+\varepsilon)$. One approach to solve this problem is to take multiple samples at the same configuration input $\vec{x}$, so that $C(\vec{x})$ can be obtained from the average of the multiple $\tilde{C}(\vec{x})$. However, it should be understood that such an approach is likely to result in a significant increase in searching cost.

In accordance with one or more embodiments, the methods and systems described herein are designed to address the above problem, such that only one sample is taken at each input configuration, by transferring Equation (1) to the following equivalent format:

$$\underset{\vec{x}}{\text{minimize}} \log C(\vec{x}) = \log P(\vec{x}) + \log T(\vec{x}) \qquad (7)$$

$$\text{subject to } \log T(\vec{x}) \le \log T_{max}$$

BO may be used to minimize log $C(\vec{x})$ instead of $C(\vec{x})$ because $$\log \tilde{C}(\vec{x}) = \log C(\vec{x}) + \log(1+\varepsilon) \qquad (8)$$

Since $\varepsilon$ is typically small (e.g., $\varepsilon$<100%), this gives:

$$\log \tilde{C}(\vec{x}) \approx \log C(\vec{x}) + \varepsilon \qquad (9)$$

Therefore, in at least some embodiments, the confidence interval log $C(\vec{x})$ may be computed with the sample on log $\tilde{C}(\vec{x})$ and $\varepsilon$, as discussed above.

The methods and systems of the present disclosure provide an improvement over existing cloud configuration selection techniques in a number of respects, and for a variety of reasons tied to the specific design features described above.

For example, the methods and systems presented focus prediction on best or optimal cloud configurations. In contrast to existing performance prediction solutions, which often require many training samples to improve prediction accuracy, the methods and systems described herein spend a limited number of samples to improve the prediction accuracy of those candidate cloud configurations that are closer to what is considered to be the best or optimal.

In accordance with some embodiments, the methods and systems provided herein are designed to automatically learn the non-linear relationships between running time and cloud configurations. For example, the system may be configured to automatically capture system insights between cloud resources and the running time.

Further, the methods and systems of the present disclosure may be configured to dynamically adapt the search process across cloud configurations based on individual applications. For example, in one or more embodiments, the method may adapt the search of candidate cloud configurations based on features (e.g., CPU, RAM, etc.) that are determined to be most significant to a subject application.

Figure 4:
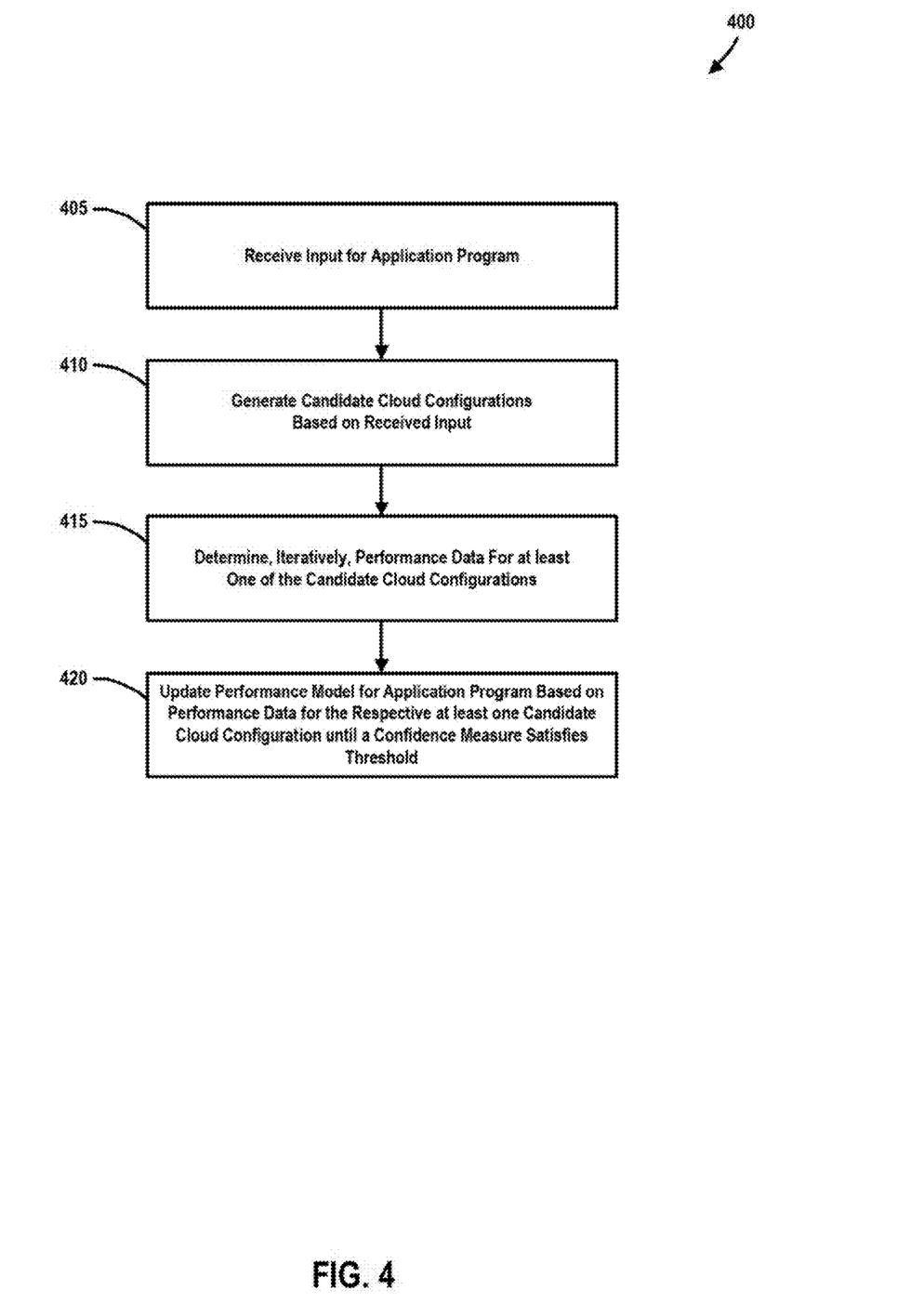
FIG. 4 is a flowchart illustrating an example process for facilitating selection of a cloud configuration for deploying an application program, according to one or more embodiments described herein.

FIG. 4 is an example process 400 for facilitating selection of a cloud configuration for deploying an application program, in accordance with one or more embodiments described herein. For example, in accordance with at least one embodiment described herein, the example process 400 may be performed by a system for cloud configuration selection (e.g., example system 100 shown in FIG. 1), and may include the operations of blocks 405-420.

At block 405, input may be received for the application program. For example, in an embodiment, the input received at block 405 may be received at a controller or control unit in a computer (e.g., input (160) received at search controller 120 in the example system 100 shown in FIG. 1). In an embodiment, the input received at block 405 may include, for example, a representative workload for the application program, an objective (e.g., minimize cost, minimize run time, etc.), one or more constraints (e.g., cost budget, maximum running time, preferred instance types, maximum/minimum cluster size, etc.), or any combination thereof. In some embodiments, the input received at the search controller 120 may include various other data in addition to or instead of the example inputs described above.

At block 410, candidate cloud configurations may be generated for the application program based on the input received at block 405.

At block 415, performance data may be determined (e.g., generated, obtained, etc.) for at least one of the candidate cloud configurations generated at block 410. In an embodiment, the performance data that may be determined at block 415 may be determined in an iterative manner, such that performance data is determined for successive candidate cloud configurations. For example, in an embodiment, the performance data that may be determined at block 415 may be based on running the at least one candidate cloud configuration in at least one cloud platform (e.g., one or more of cloud platforms 105 in the example system 100 shown in FIG. 1). In an embodiment in which the input received at block 405 includes a representative workload, running the at least one candidate cloud configuration in at least one cloud platform may include, for example, installing the representative workload to the at least one cloud platform. In at least one embodiment, installing the representative workload to the at least one cloud platform may include creating a virtual machine in the at least one cloud platform, and installing the representative workload in the virtual machine.

At block 420, a performance model for the application program may be updated based on the performance data obtained for the respective at least one candidate cloud configuration at block 415. For example, in an embodiment, the performance model for the application program may be updated by calculating (e.g., computing, determining, etc.) a confidence measure for an objective function based on the performance data obtained for the candidate cloud configuration (at block 415). In an embodiment, calculating a confidence measure for an objective function may be similar to computing the confidence interval of the objective function $C(\vec{x})$, which is described in detail above.

The performance model for the application program may be updated at block 420 until a confidence measure for the updated performance model satisfies a threshold, in an embodiment. For example, in accordance with at least one embodiment, the confidence measure for the updated performance model may be similar to the confidence interval described above with respect to FIGS. 2 and 3. In an embodiment, block 420 may include determining whether a stopping condition has been satisfied or met. Examples of such a stopping condition are described in detail above. For example, in an embodiment, the stopping condition may be based on a determination that a modified expected improvement (e.g., as defined in Equation (4) above) is less than a threshold percentage (e.g., 8%, 10%, 13%, etc.) and at least a minimum number (e.g., 5, 6, 8, etc.) of candidate cloud configurations have been observed (e.g., evaluated, assessed, etc.).

In some embodiments, the example process 400 for facilitating selection of a cloud configuration may include one or more other operations or processes in addition to or instead of the example operations shown in FIG. 4 and described above. For example, in an embodiment, in response to making a determination that the confidence measure for the updated performance model satisfies the threshold, the current (or subject) candidate cloud configuration may be selected as the cloud configuration for deploying the application program. For example, in such a situation, it may be determined that the current candidate cloud configuration is the optimal cloud configuration for the application program given various objectives and constraints that may be involved. In another embodiment, in response to determining that the confidence measure for the updated performance model does not satisfy the threshold, another (e.g., new) candidate cloud configuration may be selected from the candidate cloud configurations generated for the application program at block 410. In a scenario where a new candidate cloud configuration has been selected, the example operations of blocks 415-420, which are described in detail above, may be performed using the new candidate could configuration, according to an embodiment.

Figure 5:
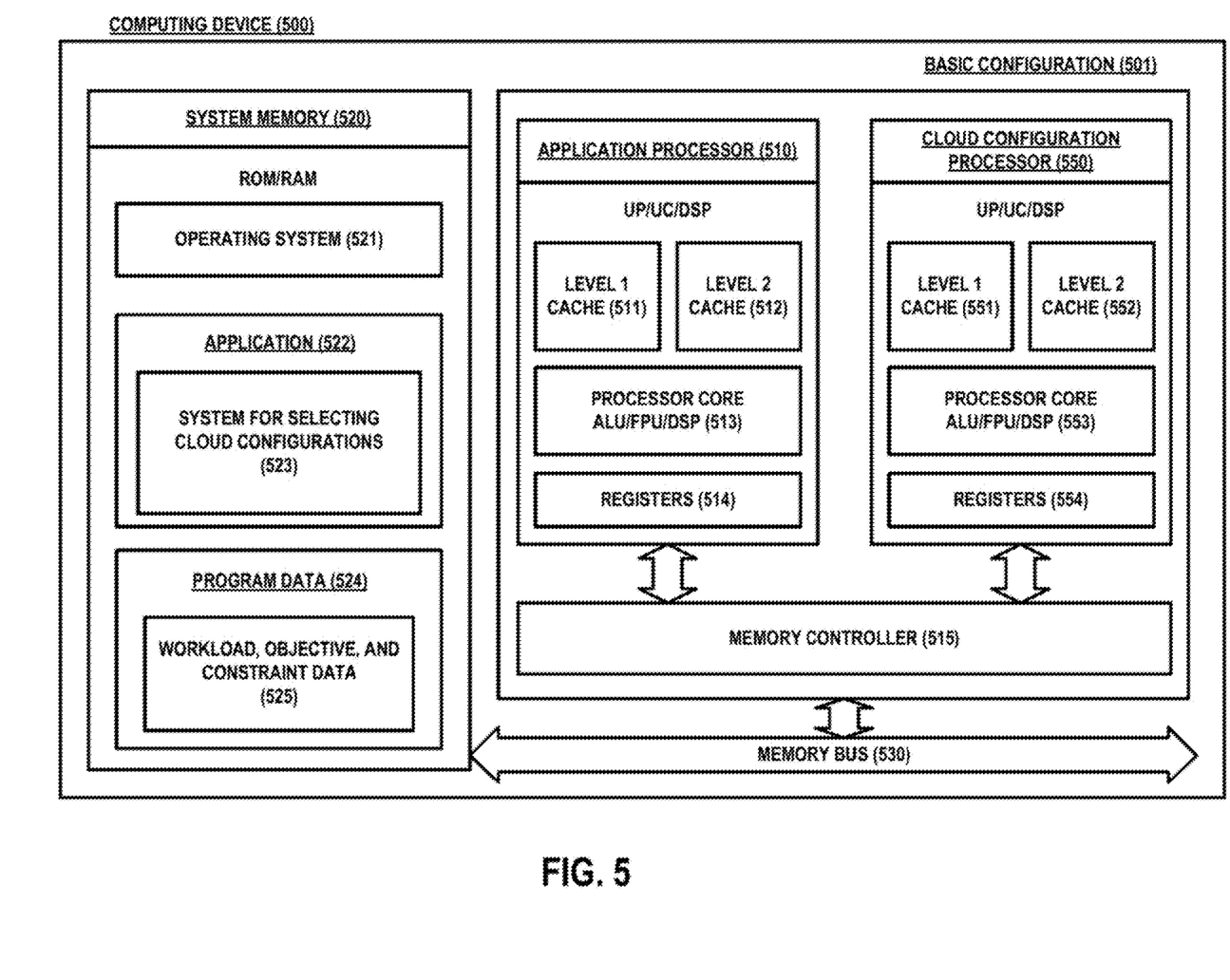
FIG. 5 is a block diagram illustrating an example computing device arranged for selecting an optimal cloud configuration for an application based on adaptive performance model generated for the application, according to one or more embodiments described herein.

FIG. 5 is a high-level block diagram of an exemplary computing device (500) that is arranged for selecting an optimal cloud configuration for an application based on adaptive performance model generated for the application, in accordance with one or more embodiments described herein. For example, in accordance with at least one embodiment of the present disclosure, the computing device (500) may be configured to adaptively and automatically build a performance model for a given application, and utilize the performance model to determine an optimal cloud configuration from a group of candidate cloud configurations. In a basic configuration (501), the computing device (500) typically includes one or more processors (510, 550) and system memory (520). A memory bus (530) can be used for communicating between the one or more processors (510, 550) and the system memory (520).

Depending on the desired configuration, the one or more processors (510, 550) can be of any type including but not limited to a microprocessor (μP), a microcontroller (μC), a digital signal processor (DSP), or the like, or any combination thereof. For example, in accordance with at least one embodiment, one processor may be an Application Processor (510) while another processor is a dedicated Cloud Configuration Processor (550). In such a configuration, the dedicated Cloud Configuration Processor (550) may operate continuously to perform, for example, interface operations and communications between the computing device (500) and one or more cloud platforms (e.g., one or more of cloud platforms 105A, 105B, 105N in the example system 100 shown in FIG. 1). Either or both of the processors (510, 550) can include one more levels of caching, such as a level one cache (511, 551) and a level two cache (512, 552), a processor core (513, 553), and registers (514, 554). The processor core (513, 553) can include an arithmetic logic unit (ALU), a floating point unit (FPU), a digital signal processing core (DSP Core), or the like, or any combination thereof. A memory controller (515) can also be used with the one or more processors (510, 550), or in some implementations separate memory controllers (515) can be an internal part of each of the one or more processors (510, 550).

Depending on the desired configuration, the system memory (520) can be of any type including but not limited to volatile memory (such as RAM), non-volatile memory (such as ROM, flash memory, etc.) or any combination thereof. System memory (520) typically includes an operating system (521), one or more applications (522), and program data (524). The application (522) may include a system for selecting cloud configurations (523). In accordance with at least one embodiment of the present disclosure, the system for selecting cloud configurations (523) is designed to adaptively and automatically build (e.g., generate) a performance model for a specific application, and utilize the performance model to determine an optimal cloud configuration for the application from a group of candidate cloud configurations. The system for selecting cloud configurations (523) is capable of building an accurate model of an application's performance while significantly reducing associated cost and running time.

Program Data (524) may include storing instructions that, when executed by the one or more processing devices, implement a system (523) and method for selecting cloud configurations. Additionally, in accordance with at least one embodiment, program data (524) may include workload, objective, and constraint data (525), which may relate to, for example, a representative workload of an application, an objective (e.g., minimize cost, minimize run time, etc.), and one or more constraints (e.g., cost budget, maximum running time, preferred instance types, maximum/minimum cluster size, etc.). In accordance with at least some embodiments, the application (522) can be arranged to operate with program data (524) on an operating system (521).

The computing device (500) can have additional features or functionality, and additional interfaces to facilitate communications between the basic configuration (501) and any required devices and interfaces.

System memory (520) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media can be part of the device (500).

The computing device (500) may be implemented as a portion of a small-form factor portable (or mobile) electronic device such as a cell phone, a smartphone, a personal data assistant (PDA), a personal media player device, a tablet computer (tablet), a wireless web-watch device, a personal headset device, an application-specific device, or a hybrid device that includes any of the above functions. In addition, the computing device (500) may also be implemented as a personal computer including both laptop computer and non-laptop computer configurations, one or more servers, Internet-of-Things systems, and the like.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In accordance with at least one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While particular embodiments of the subject matter have thus been described, it is to be appreciated that other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multi-tasking and parallel processing may be advantageous.

What is claimed is:

1. A computer-implemented method for facilitating selection of a cloud configuration for deploying an application program, the method comprising:
    receiving, at a processor, input for the application program;
    generating, by the processor, candidate cloud configurations for the application program based on the received input;
    determining, by the processor, performance data for a first candidate cloud configuration of the candidate cloud configurations, the performance data based on running the first candidate cloud configuration in at least one cloud platform;
    updating, by the processor, a performance model for the application program based on the performance data for the first candidate cloud configuration;
    determining, by the processor, whether a confidence measure for the updated performance model satisfies a threshold, wherein the confidence measure indicates a range of an objective function defined for the application program,
    responsive to determining that the confidence measure for the updated performance model satisfies the threshold, selecting, by the processor, the first candidate cloud configuration as the cloud configuration for deploying the application program; and
    responsive to determining that the confidence measure for the updated performance model does not satisfy the threshold selecting, by the processor, a second candidate cloud configuration of the candidate cloud configurations based on the updated performance model for the application program.

2. The method of claim 1, wherein updating the performance model for the application program includes updating the confidence measure using Bayesian optimization.

3. The method of claim 1, wherein the received input includes at least a representative workload for the application program, further comprising:
    installing the representative workload to the at least one cloud platform.

4. The method of claim 3, wherein installing the representative workload to the at least one cloud platform includes:
    creating a virtual machine in the at least one cloud platform; and
    installing the representative workload in the virtual machine.

5. The method of claim 4, further comprising: capturing a virtual machine image containing the installed workload.

6. The method of claim 1, wherein the received input includes at least one of: a representative workload for the application program, an objective, and a constraint.

7. The method of claim 1, wherein the received input includes a representative workload for the application program, an objective, and a constraint.

8. A system for facilitating selection of a cloud configuration for deploying an application program, the system comprising:
    one or more processors; and
    a non-transitory computer-readable medium coupled to said one or more processors having instructions stored thereon that, when executed by said one or more processors, cause said one or more processors to perform operations comprising:
    receiving input for an application program,
    generating candidate cloud configurations for the application program based on the received input,
    determining performance data for a first candidate cloud configuration of the candidate cloud configurations, the performance data based on running the first candidate cloud configuration in at least one cloud platform,
    updating a performance model for the application program based on the performance data for the first candidate cloud configuration,
    determining whether a confidence measure for the updated performance model satisfies a threshold, wherein the confidence measure indicates a range of an objective function defined for the application program,
    responsive to determining that the confidence measure for the undated performance model satisfies the threshold, selecting the first candidate cloud configuration as the cloud configuration for deploying the application program, and
    responsive to determining that the confidence measure for the updated performance model does not satisfy the threshold, selecting a second candidate cloud configuration of the candidate cloud configurations based on the updated performance model for the application program.

9. The system of claim 8, wherein updating the performance model for the application program includes updating the confidence measure using Bayesian optimization.

10. The system of claim 8, wherein the received input includes at least a representative workload for the application program, the one or more processors are caused to perform further operations comprising:
    installing the representative workload to the at least one cloud platform.

11. The system of claim 10, wherein the one or more processors are caused to perform further operations comprising:
    creating a virtual machine in the at least one cloud platform; and
    installing the representative workload in the virtual machine.

12. The system of claim 11, wherein the one or more processors are caused to perform further operations comprising:
   capturing a virtual machine image containing the installed workload.

13. The system of claim 8, wherein the received input includes at least one of: a representative workload for the application program, an objective, and a constraint.

14. The system of claim 8, wherein the received input includes a representative workload for the application program, an objective, and a constraint.

15. A tangible, non-transitory computer readable medium, or media, storing machine readable instructions that, when executed by one or more processors, cause the one or more processors to perform operations comprising:
   receiving input for an application program,
   generating candidate cloud configurations for the application program based on the received input,
   determining performance data for a first candidate cloud configuration of the candidate cloud configurations, the performance data based on running the first candidate cloud configuration in at least one cloud platform,
   updating a performance model for the application program based on the performance data for the first candidate cloud configuration,
   determining whether a confidence measure for the updated performance model satisfies a threshold, wherein the confidence measure indicates a range of an objective function defined for the application program,
   responsive to determining that the confidence measure for the updated performance model satisfies the threshold selecting the first candidate cloud configuration as the cloud configuration for deploying the application program, and
   responsive to determining that the confidence measure for the updated performance model does not satisfy the threshold, selecting a second candidate cloud configuration of the candidate cloud configurations based on the updated performance model for the application program.

16. The non-transitory computer-readable medium or media of claim 15, wherein updating the performance model for the application program includes updating the confidence measure using Bayesian optimization.

17. The non-transitory computer-readable medium or media of claim 15, wherein the received input includes at least a representative workload for the application program, the machine readable instructions, when executed by the one or more processors, cause the one or more processors to perform further operations comprising:
   installing the representative workload to the at least one cloud platform.

* * * * *